(12) United States Patent
Nagaoka et al.

(10) Patent No.: US 10,031,507 B2
(45) Date of Patent: Jul. 24, 2018

(54) SERVO CONTROL DEVICE

(71) Applicant: MITSUBISHI ELECTRIC CORPORATION, Chiyoda-ku (JP)

(72) Inventors: Kotaro Nagaoka, Tokyo (JP); Tomoya Fujita, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 421 days.

(21) Appl. No.: 14/650,401

(22) PCT Filed: Oct. 11, 2013

(86) PCT No.: PCT/JP2013/077803
§ 371 (c)(1),
(2) Date: Jun. 8, 2015

(87) PCT Pub. No.: WO2014/122822
PCT Pub. Date: Aug. 14, 2014

(65) Prior Publication Data
US 2015/0323924 A1    Nov. 12, 2015

(30) Foreign Application Priority Data
Feb. 7, 2013    (JP) .................................. 2013-022431

(51) Int. Cl.
*G05B 19/00* (2006.01)
*G05B 19/402* (2006.01)
(Continued)

(52) U.S. Cl.
CPC ........... *G05B 19/402* (2013.01); *G05B 15/02* (2013.01); *G05B 19/404* (2013.01);
(Continued)

(58) Field of Classification Search
CPC ................................ G05B 9/00; G05B 19/402
See application file for complete search history.

(56) References Cited

U.S. PATENT DOCUMENTS

| | | | |
|---|---|---|---|
| 6,744,233 B1* | 6/2004 | Tsutsui ................. | G05B 19/404 318/560 |
| 2004/0183494 A1* | 9/2004 | Nagaoka ................. | G05B 19/19 318/632 |

(Continued)

FOREIGN PATENT DOCUMENTS

| | | |
|---|---|---|
| CN | 1523465 A | 8/2004 |
| JP | 4-218719 A | 8/1992 |

(Continued)

OTHER PUBLICATIONS

International Search Report dated Nov. 12, 2013 in PCT/JP2013/077803 filed Oct. 11, 2013.

(Continued)

*Primary Examiner* — Tejal Gami
(74) *Attorney, Agent, or Firm* — Oblon, McClelland, Maier & Neustadt, L.L.P.

(57) ABSTRACT

A servo control device including a servo control unit that calculates a drive command that causes a feedback position from a motor to be driven to follow a command position, to drive the motor according to the drive command, a moving-state determination unit that determines a speed of the motor is by simulating a response of the motor, and outputs a determination result as a moving state, a correction-amount selection unit that selects a correction amount according to a change pattern of the moving state at a timing when the determined moving state changes, and an addition unit that adds the correction amount output from the correction-amount selection unit to the drive command calculated by the servo control unit to generate a corrected drive command, and sets the corrected drive command as a drive command to the motor instead of the drive command calculated by the servo control unit.

9 Claims, 4 Drawing Sheets

(51) Int. Cl.
G05B 15/02 (2006.01)
G05B 19/404 (2006.01)
(52) U.S. Cl.
CPC .............. *G05B 2219/33347* (2013.01); *G05B 2219/37589* (2013.01); *G05B 2219/41154* (2013.01)

(56) References Cited

U.S. PATENT DOCUMENTS

2010/0245409 A1* 9/2010 Iesaki ..................... B41J 29/38
347/5
2013/0223494 A1* 8/2013 Jensen .................. G01M 3/184
375/224

FOREIGN PATENT DOCUMENTS

| | | |
|---|---|---|
| JP | 2000-010612 A | 1/2000 |
| JP | 2000-035814 A | 2/2000 |
| JP | 2001-022417 A | 1/2001 |
| JP | 2001-175313 A | 6/2001 |
| JP | 2005-266932 A | 9/2005 |
| JP | 2008-210273 A | 9/2008 |
| WO | 02/39574 A1 | 5/2002 |

OTHER PUBLICATIONS

Chinese Office Action dated Mar. 12, 2018, issued in Chinese Patent Application No. 201380072456.2 (with English translation).

* cited by examiner

SERVO CONTROL DEVICE

FIELD

The present invention relates to a servo control device that drives a mechanical device such as a machine tool by servo control.

BACKGROUND

A servo control device that drives a mechanical device such as a machine tool generates a drive command to a motor that drives a tool and a table by feedback control, so that positions of the tool and the table provided in a machine follow a command value. As a motor that drives the tool and the table, there is a case in which a rotary motor is used or a case in which a linear motor is used. A drive command becomes a torque command when the rotary motor is used, and becomes a propulsion command when the linear motor is used. In the present specification, a case in which the rotary motor is used is explained.

Particularly, servo control that drives a mechanical system in a mechanical device so that a tool position with respect to an object to be machined (a workpiece) accurately follows a commanded path (commanded locus) is referred to as "locus control" or "contour motion control", and the servo control is performed precisely by using a numerical control device and a servo control device attached thereto. The mechanical system in a mechanical device that is to be controlled has a plurality of shafts, and motors constituting those shafts are controlled to drive by using the servo control device.

The servo control device also has a function of predicting and correcting an error (particularly, an error in locus) generated due to a disturbance in addition to the feedback control, in order to suppress an influence of a disturbance factor such as friction present in the mechanical system. Particularly, when the moving direction of a feed shaft is reversed, the direction in which the friction acts is also reversed, and the influence thereof appears conspicuously in the locus error.

As a typical example thereof, there is a tracking error that occurs when a circular arc locus is commanded and the moving direction of the feed shaft is reversed in a quadrant switching portion of the circular arc locus. When an error amount in a radial direction is enlarged and plotted, this error has a shape in which the locus projects outward in a protruding shape, and thus the error is referred to as "quadrant protrusion". If a tracking error such as the quadrant protrusion occurs, slits or flaws are generated in the machining result, which is not desirable.

Therefore, for example, conventionally as shown in Patent Literature 1, there has been a method of estimating a change in friction torque generated before and after a motion direction of a feed drive mechanism is reversed, at the time when a position command direction is reversed, and adding the estimated change amount of the friction torque to a torque command.

CITATION LIST

Patent Literature

Patent Literature 1: Japanese Patent Application Laid-open No. 2001-22417

SUMMARY

Technical Problem

However, according to the conventional technique described above, there have been the two following problems.

The first problem is that correction is performed at a timing when a speed command value sign is reversed; however, the correction is not performed when the feed drive mechanism is stopped temporarily during the movement in the same direction, and thus a tracking error occurs when moving after the stop, thereby causing an error in the locus.

The second problem is that it is not taken into consideration whether the feed drive mechanism has been stopped immediately before reversing the moving direction thereof. Therefore, when a friction disturbance decreases at the time of stop, a correction amount becomes too much if the feed drive mechanism is stopped temporarily before reversing the direction, and the locus tracking error cannot be suppressed sufficiently.

The present invention has been achieved in view of the above problems, and an object of the present invention is to provide a servo control device that can reduce a tracking error generated due to friction.

Solution to Problem

In order to solve the aforementioned problems, a servo control device including a servo control unit that calculates a drive command that causes a feedback position from a motor to be driven to follow a command position, to drive the motor according to the drive command according to one aspect of the present invention is constructed to include: a moving-state determination unit that determines as to which of positive, negative, or zero a speed of the motor is by simulating a response of the motor, and outputs a determination result as a moving state; a correction-amount selection unit that selects a correction amount according to a change pattern of the moving state at a timing when the determined moving state changes; and an addition unit that adds the correction amount output from the correction-amount selection unit to the drive command calculated by the servo control unit to generate a corrected drive command, and sets the corrected drive command as a drive command to the motor instead of the drive command calculated by the servo control unit.

Advantageous Effects of Invention

According to the present invention, correction can be performed for a friction amount when the feed drive mechanism is stopped temporarily during movement in the same direction. If the feed drive mechanism is stopped temporarily before reversing the direction, the correction can be performed with an appropriate correction amount taking into consideration the friction amount at the time of stop. Accordingly, a servo control device that can reduce a tracking error generated due to friction can be obtained.

DESCRIPTION OF EMBODIMENTS

Exemplary embodiments of a servo control device according to the present invention will be explained below in detail with reference to the accompanying drawings. The present invention is not limited to the embodiments.

First Embodiment

Figure 1:
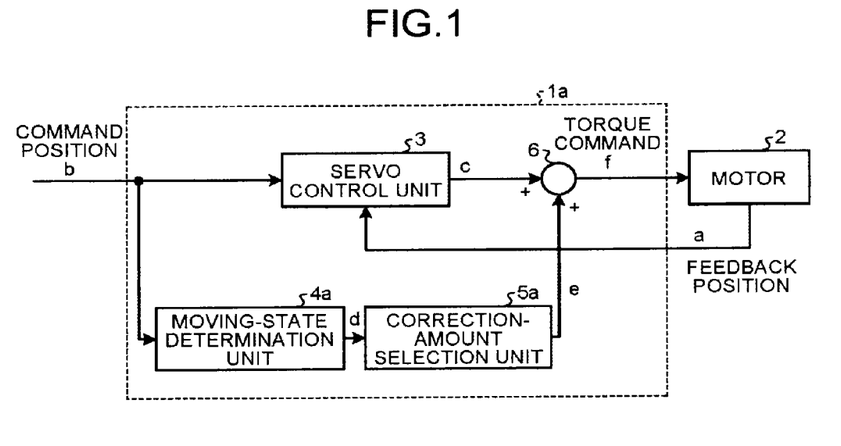
FIG. 1 is a block diagram showing a configuration of a servo control device according to a first embodiment of the present invention.

FIG. 1 is a block diagram showing a configuration of a servo control device according to a first embodiment of the present invention. In FIG. 1, a motor 2 as a direct control object of a servo control device 1a according to the first embodiment is a rotary motor in the present specification, and is attached with either one or both of a position detector and a speed detector. A feedback position 'a' input from the motor 2 to the servo control device 1a is a detection value of the position detector or an integrated value of a detection value of the speed detector.

Figure 8:
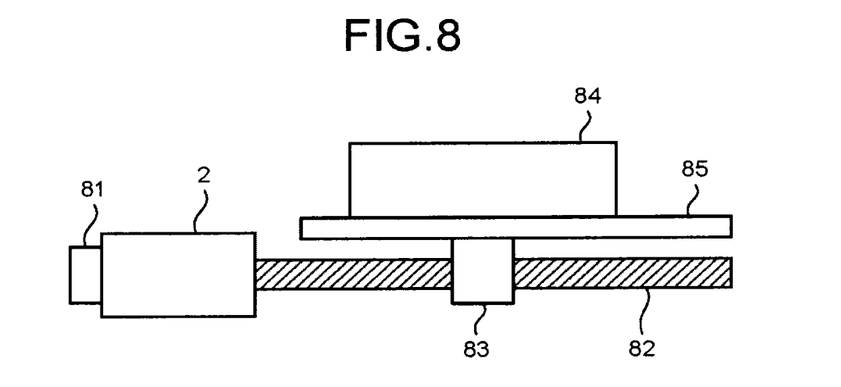
FIG. 8 is a side view showing an example of a mechanical system in a mechanical device as a control object of the servo control device shown in FIG. 1 and FIG. 5.

FIG. 8 is a side view showing an example of a mechanical system in a mechanical device as a control object of the servo control device shown in the first embodiment (FIG. 1) and a second embodiment (FIG. 5) described later. In the present specification, it is assumed that the motor 2 is assembled in a mechanical system, for example, as shown in FIG. 8.

In FIG. 8, a position detector 81, for example, is attached to the motor 2. The position detector 81 is a rotary encoder or the like, and outputs a detected motor position as the feedback position 'a'.

A ball screw 82 having a predetermined length is connected to or formed on a rotary shaft of the motor 2. The ball screw 82 is assembled with a movable portion including a nut 83, a table 84, and a linear guide 85. The nut 83 is fixed to a rear surface of the table 84, and converts rotation of the ball screw 82 to linear movement. The linear guide 85 is for supporting the table 84 and restraining the motion direction of the table 84.

The position directly detected by the position detector 81 is an angle of rotation of the motor 2, which can be converted to a moved length of the table in the moving direction by multiplying the angle by a ball screw lead, which is a moved distance of the table per one rotation of the motor, and dividing the multiplication result by an angle $2\pi$ [rad] of one rotation of the motor. In the following explanations, it is assumed that a value converted to the moved length of the table in the moving direction is used as the motor position.

In FIG. 1, the servo control device 1a includes a servo control unit 3, a moving-state determination unit 4a, a correction-amount selection unit 5a, and an addition unit 6, as a configuration that reduces the tracking error generated due to friction.

To the servo control unit 3, a command position 'b' from a controller (not shown) and a rotational position of the motor 2 detected by the position detector 81 as the feedback position 'a' are input. The servo control unit 3 performs servo control according to the configuration shown, for example, in FIG. 2, so that the feedback position 'a' follows the command position 'b'. Generally, the motor 2 is directly driven according to a torque command 'c' calculated as a result of the servo control performed by the servo control unit 3. However, in the present embodiment, the addition unit 6 is provided, and the torque command 'c' calculated as the result of the servo control performed by the servo control unit 3 is one of inputs to the addition unit 6.

Figure 3:
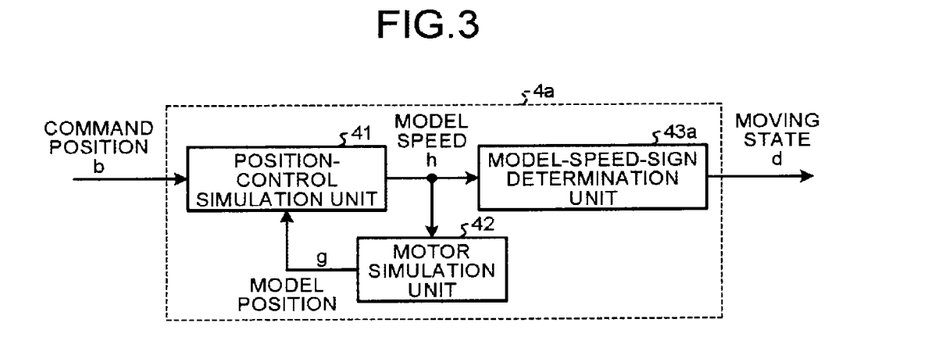
FIG. 3 is a block diagram showing a configuration example of a moving-state determination unit shown in FIG. 1.

The moving-state determination unit 4 determines as to which of positive, zero, or negative the moving speed of the motor 2 is on the basis of the command position 'b' input from a controller (not shown) according to the configuration, for example, shown in FIG. 3, and outputs the determination result to the correction-amount selection unit 5a as a moving state 'd'.

The correction-amount selection unit 5a selects a torque correction amount 'e' according to the moving state 'd' input from the moving-state determination unit 4a, and designates the selected torque correction amount 'e' as the other one of the inputs to the addition unit 6. The addition unit 6 adds the torque correction amount 'e' selected by the correction-amount selection unit 5a to the torque command 'c' calculated by the servo control unit 3, and an added torque command 'f' is designated as an output of the servo control device 1a.

Operations of the correction-amount selection unit 5a are specifically explained. At the timing when the moving state 'd' as an output of the moving-state determination unit 4a has changed from positive to negative or from negative to positive, the correction-amount selection unit 5a outputs the torque correction amount 'e' corresponding to each state. Friction torque generated in the motor 2 when the moving direction is reversed is modeled in advance, and a value of the torque correction amount 'e' is calculated based on the model.

The model can be arranged such that certain friction torque is generated in a direction opposite to the moving direction, for example, as in the Coulomb friction. In FIG. 1, an example in which the addition unit 6 is provided and the obtained torque correction amount 'e' is added to the torque command 'c' is shown. However, for example, instead of adding the torque correction amount 'e' to the torque command, the torque correction amount 'e' can be added to an integral term in the speed control unit (see FIG. 2) in the servo control unit 3.

The correction-amount selection unit 5a outputs the torque correction amount 'e' at a timing when the moving state 'd' as an output of the moving-state determination unit 4a has changed from speed zero to a state other than the speed zero (that is, positive or negative). Friction torque generated in the motor 2 when the moving direction is reversed is modeled in advance, and the value of the torque correction amount 'e' at this time is calculated on the basis of the model.

Figure 2:
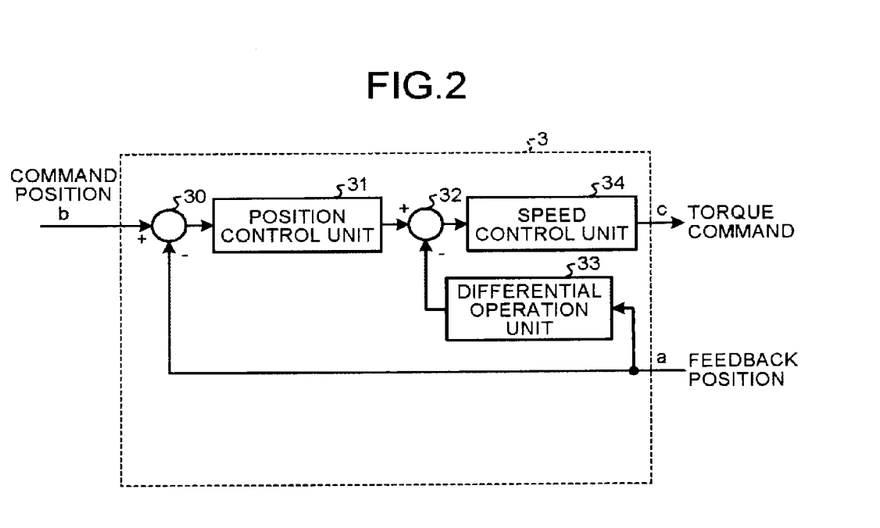
FIG. 2 is a block diagram showing a configuration example of the servo control device shown in FIG. 1.

The servo control unit 3 includes, for example, as shown in FIG. 2, addition/subtraction units 30 and 32, a position control unit 31, a differential operation unit 33, and a speed control unit 34.

In FIG. 2, the addition/subtraction unit 30 obtains a deviation (a position deviation) between the command position 'b' and the feedback position 'a', and outputs the deviation to the position control unit 31. The position control unit 31 performs position control such as proportional control so as to reduce the position deviation input from the addition/subtraction unit 30, and outputs a speed command to reduce the position deviation. The differential operation unit 33 differentiates the feedback position 'a' to obtain an actual speed.

The differential processing is replaced by subtraction processing in a discrete-time system. That is, a value obtained by dividing a difference between the current feedback position and a feedback position one sample before by a control processing period is used as an approximate differential value.

The addition/subtraction unit 32 obtains a deviation (a speed deviation) between the speed command obtained by the position control unit 31 and the actual speed obtained by the differential operation unit 33, and outputs the deviation to the speed control unit 34. The speed control unit 34 performs speed control such as proportional-integral control so as to reduce the speed deviation input from the addition/subtraction unit 32 and outputs the torque command 'c'.

The servo control unit 3 uses the difference between the command position 'b' and the feedback position 'a' as a position deviation, to perform the feedback control so as to suppress the position deviation, thereby enabling to control so that the feedback position 'a' follows the command position 'b'.

The moving-state determination unit 4a includes, for example, as shown in FIG. 3, a position-control simulation unit 41, a motor simulation unit 42, and a model-speed-sign determination unit 43a.

In FIG. 3, the position-control simulation unit 41 performs position control such as proportional control so that a deviation (a position deviation) between the command position 'b' input from a controller (not shown) and a model position 'g' output by the motor simulation unit 42 described later decreases, and outputs a model speed 'h' as a command to reduce the position deviation.

The model speed 'h' is input to the motor simulation unit 42 and the model-speed-sign determination unit 43a.

The motor simulation unit 42 performs an operation to simulate the characteristic of the motor 2 by using the model speed 'h' and outputs the operation result as the model position 'g'. Specifically, the motor simulation unit 42 performs integration of the model speed 'h' once as the operation to simulate the characteristic of the motor 2 and outputs the integrated value as the model position 'g'. The model position 'g' corresponds to the feedback position 'a' shown in FIG. 1 and FIG. 2, and the model speed 'h' also corresponds to the speed command output by the position control unit 31 described above. That is, the position-control simulation unit 41 has an input and an output equivalent to those of the position control unit 31 described above, and performs the same operational processing as that of the position control unit 31 in the inside thereof.

The model-speed-sign determination unit 43a determines as to which of positive, zero, or negative the sign of the model speed 'h' is, and outputs the determination result as the moving state 'd'. In the determination processing as to whether the sign of the model speed 'h' is speed zero, a speed threshold and a time threshold are first set in advance, and it is defined that a state where an absolute value of the model speed 'h' is equal to or lower than the speed threshold is a speed zero state. Subsequently, when the speed zero state continues for a time period more than the time set by the time threshold, it is determined that the moving state is speed zero. For the speed threshold and the time threshold, minimum resolution of the speed and a positive constant to the extent of a sampling period are set in advance. By setting such thresholds, an erroneous determination of the moving state resulting from an operational error can be prevented.

In this manner, the moving-state determination unit 4a simulates a response of the motor 2 and performs a speed sign determination with respect to the model position, which is the simulated response, thereby enabling to determine the moving state 'd' stably.

Figure 4:
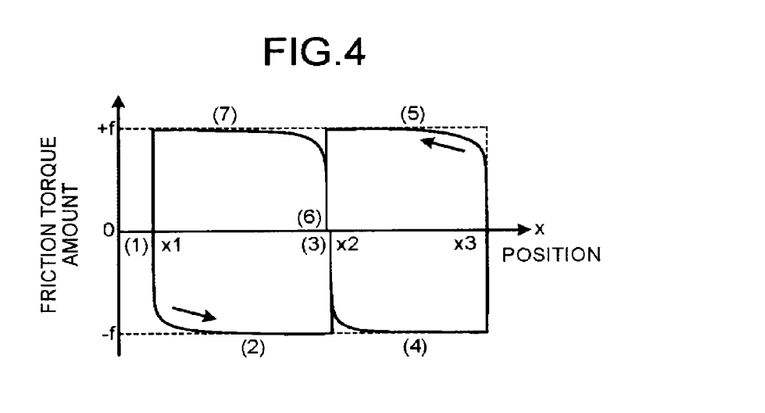
FIG. 4 is an explanatory diagram of a tracking-error reduction operation according to the first embodiment.

A tracking-error reduction operation according to the first embodiment is explained below with reference to FIG. 4. FIG. 4 shows a relation between a position 'x' and friction torque 'f' at the time of driving the motor. In FIG. 4, a state (1) to a state (7) show an example of a change pattern of the moving state of the motor 2.

The state (1) shows a state where the motor 2 is stopped at a position x1 (moving state=zero). The state (2) shows a state where the motor 2 is moving in a positive direction from the position x1 to a position x2 (moving state=positive). The state (3) shows a state where the motor 2 is stopped at the position x2 (moving state=zero). The state (4) shows a state where the motor 2 is moving in the positive direction from the position x2 to a position x3 (moving state=positive). The state (5) shows a state where the motor 2 is moving in a negative direction to the position x2 without stopping at the position x3 (moving state=negative). The state (6) shows a state where the motor 2 is stopped at the position x2 (moving state=zero). The state (7) shows a state where the motor 2 is moving in the negative direction from the position x2 to the position x1 (moving state=negative).

The friction torque is generated in a direction opposite to the moving direction, and the size thereof becomes a constant value in the case of the Coulomb friction. In FIG. 4, it is shown that if the size of the friction torque is assumed to be f, friction torque of −f occurs at the time of moving in the positive direction, and friction torque of +f occurs at the time of moving in the negative direction, and that the friction torque during the stopped state becomes zero.

When the moving state changes, the friction torque is generated, and the change acts on the control system as a disturbance, thereby causing a tracking error of a transitional position. Further, generated friction torque changes in a different pattern, depending on the change pattern of the moving state.

Therefore, the correction-amount selection unit 5a sets the torque correction amount 'e' according to a pattern in which the moving state 'd' output by the moving-state determination unit. 4a changes. It is assumed that the torque correction amount 'e' is an amount that cancels the change of the friction torque at the time of change of the moving state 'd'. The torque correction amount 'e' for each of the change patterns of the moving state is set in advance as a parameter.

That is, when the moving state 'd' changes from positive to negative, the friction torque changes from −f to +f. Therefore, the torque correction amount 'e' is designated as −2f, which is an amount that cancels a difference between −f and +f. Similarly, when the moving state 'd' changes from negative to positive, the friction torque changes from +f to −f, and thus the torque correction amount 'e' is designated as +2f. Further, when the moving state changes from speed zero to negative, the friction torque changes from 0 to +f, and thus the torque correction amount 'e' is designated as −f as an amount that cancels the difference between 0 and +f.

Similarly, when the moving state changes from speed zero to positive, the friction torque changes from 0 to −f, and thus the torque correction amount 'e' is designated as +f.

In the case of a moving path assumed in the first embodiment, in the state from the state (1) to the state (2) and from the state (3) to the state (4), the moving state changes respectively from speed zero to positive, and thus +f is selected as the torque correction amount 'e'. In the state from the state (4) to the state (5), the moving state changes from positive to negative, and thus −2f is selected as the torque correction amount 'e'. Further, in the state from the state (6) to the state (7), the moving state changes from speed zero to negative, and thus −f is selected as the torque correction amount 'e'.

As described above, according to the first embodiment, even when the motor stops temporarily during movement in the same direction, the torque command to be output to the motor is corrected. Therefore, the change of the friction torque can be corrected. Accordingly, the tracking error resulting from the change of the friction torque at the time of change of the moving state can be corrected, and the locus tracking error can be suppressed. At this time, the response of the motor is simulated to perform a speed sign determination with respect to the model position, which is the simulated response, thereby enabling to determine the moving state stably.

Second Embodiment

Figure 5:
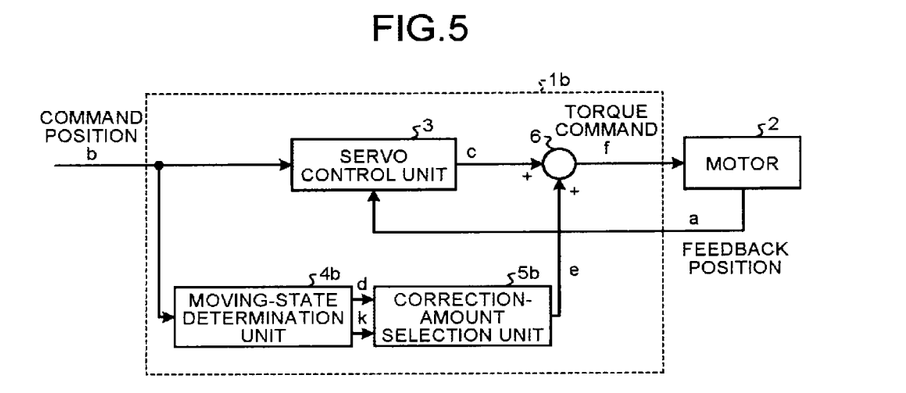
FIG. 5 is a block diagram showing a configuration of a servo control device according to a second embodiment of the present invention.

FIG. 5 is a block diagram showing a configuration of a servo control device according to the second embodiment of the present invention. In FIG. 5, constituent elements identical or equivalent to the constituent elements shown in FIG. 1 (the first embodiment) are denoted by the same reference signs. In the following descriptions, parts related to the second embodiment are mainly explained.

In FIG. 5, in the configuration shown in FIG. 1 (the first embodiment), a servo control device 1b according to the second embodiment is provided with a moving-state determination unit 4b instead of the moving-state determination unit 4a. In a correction-amount selection unit 5b, the sign of which has been changed, some functions have been added to the correction-amount selection unit 5a.

Figure 6:
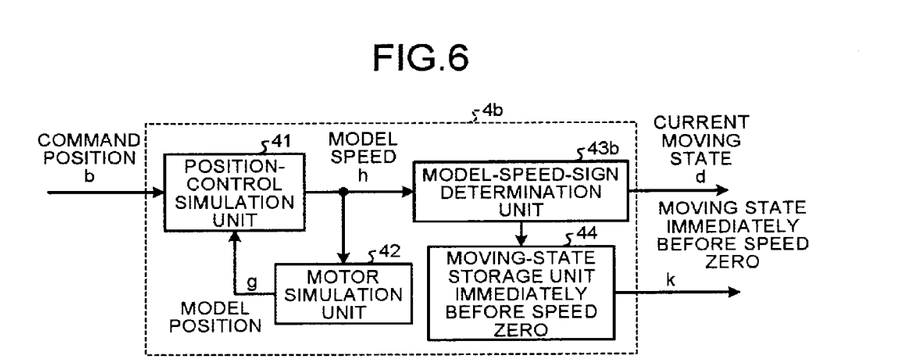
FIG. 6 is a block diagram showing a configuration example of a moving-state determination unit shown in FIG. 5.

FIG. 6 is a block diagram showing a configuration example of the moving-state determination unit shown in FIG. 5. As shown in FIG. 6, the moving-state determination unit 4b is added with a "moving-state storage unit 44 immediately before speed zero" in the configuration shown in FIG. 3 (the first embodiment), and in a model-speed-sign determination unit 43b, the sign of which has been changed from 43a, some functions have been added to the model-speed-sign determination unit 43a.

The model-speed-sign determination unit 43b determines as to which of positive, zero, or negative the sign of the model speed 'h' is, as in the model-speed-sign determination unit 43a, and outputs the determination result as the moving state (in the second embodiment, as "current moving state") 'd'. In addition, in the second embodiment, when the determined current moving state 'd' is speed zero, that is, when the current moving state 'd' has changed from a state other than speed zero to speed zero, the model-speed-sign determination unit 43b outputs a moving state 'k' immediately before speed zero to the moving-state storage unit 44 immediately before speed zero to store the moving state 'k' therein. The moving-state storage unit 44 immediately before speed zero outputs the moving state 'k' immediately before speed zero stored therein to the correction-amount selection unit 5b.

According to the second embodiment, it is assumed that the friction torque during the stopped state does not become zero. This refers to a case where the linear guide 85 that supports, for example, the table 84 has a spring characteristic, in the example shown in FIG. 8. In this case, a change amount of the friction torque when the motor moves from the stopped state changes depending on the moving direction immediately before becoming the stopped state. Therefore, in the second embodiment, the moving state immediately before the moving state becomes speed zero is stored, so that the moving state can be output from the moving-state determination unit 4b to the correction-amount selection unit 5b in response to a request from the correction-amount selection unit 5b.

The correction-amount selection unit 5b monitors the current moving state 'd' output by the model-speed-sign determination unit 43b, and when the current moving state 'd' has changed from positive to negative or from negative to positive, the correction-amount selection unit 5b outputs the torque correction amount 'e' of the same contents as those of the correction-amount selection unit 5a explained in the first embodiment to the addition unit 6. However, when the current moving state 'd' changes from speed zero to a state other than speed zero, in the second embodiment, the correction-amount selection unit 5b reads the moving state 'k' immediately before speed zero from the moving-state storage unit 44 immediately before speed zero. If the read "moving state 'k' immediately before speed zero" is different from the "moving state after the change (=the current moving state 'd')", the correction-amount selection unit 5b selects the torque correction amount 'e' according to the second embodiment, and outputs the selected torque correction amount 'e' to the addition unit 6.

According to the second embodiment, even if the motor is temporarily stopped before being reversed by cooperation of the moving-state determination unit 4b and the correction-amount selection unit 5b configured as described above, correction of the torque command to be output to the motor can be performed by an appropriate correction amount taking into consideration the friction torque amount in the stopped state.

Figure 7:
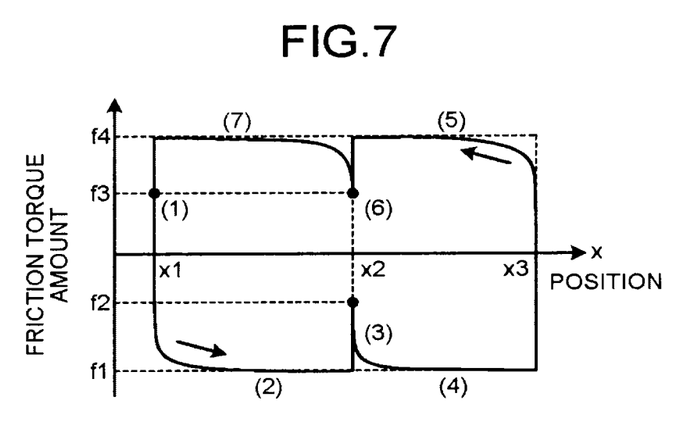
FIG. 7 is an explanatory diagram of a tracking-error reduction operation according to the second embodiment.

A tracking-error reduction operation according to the second embodiment is explained below with reference to FIG. 7. FIG. 7 shows a relation between the position 'x' and the friction torque 'f' at the time of driving the motor as in FIG. 4. The change pattern of the motor 2 (the state (1) to the state (7)) is the same as that in the first embodiment. In the second embodiment, setting of the friction torque is different from that shown in FIG. 4, and the setting is as described below.

The friction torque is generated in the direction opposite to the moving direction, and the size thereof becomes a constant value in the case of the Coulomb friction. In FIG. 7, it is shown that friction torque of f1 occurs at the time of moving in the positive direction, and friction torque of f4 occurs at the time of moving in the negative direction. Further, as the friction torque during the stopped state, a case where the friction torque does not become zero is assumed as described above. It is also assumed that when the motor is stopped after having been moved in the positive direction, friction torque of f2 occurs, and when the motor is stopped after having been moved in the negative direction, friction torque of f3 occurs.

The friction torque changes when the moving state changes, and the change acts on the control system as a disturbance, thereby causing the tracking error of the transitional position. Further, the generated friction torque changes in a different pattern, depending on the change pattern of the moving state.

The correction-amount selection unit 5b sets the torque correction amount 'e' according to the pattern in which the current moving state 'd' output from the moving-state determination unit 4b changes. It is assumed that the torque correction amount 'e' is an amount that cancels the change of the friction torque at the time of change of the current moving state 'd'. The torque correction amount 'e' for each of the change patterns of the current moving state 'd' is set in advance as a parameter. This point is the same as that in the first embodiment. However, in the second embodiment, setting of the friction torque is different from that in the first embodiment, and the setting is as described below.

That is, when the current moving state 'd' changes from positive to negative, the friction torque changes from f1 to f4. Therefore, the correction-amount selection unit 5b sets the torque correction amount 'e' to an amount that cancels a difference between f1 and f4 (f1-f4). Similarly, when the current moving state 'd' changes from negative to positive, the friction torque changes from f4 to f1. Therefore, the torque correction amount 'e' is set to (f4-f1).

Furthermore, when the current moving state 'd' changes from speed zero to positive, and if the "moving state 'k' immediately before the moving state becomes speed zero" read from the moving-state storage unit 44 immediately before speed zero is positive, the moving direction before and after the change is the same direction. In this case, because the friction torque changes from f2 to f1, the torque correction amount 'e' is set to (f2-f1), which is an amount that cancels a difference between f2 and f1.

On the other hand, when the current moving state 'd' changes from speed zero to positive, and if the "moving state 'k' immediately before the moving state becomes speed zero" read from the moving-state storage unit 44 immediately before speed zero is negative, the moving direction before and after the change is not the same direction and is different. In this case, because the friction torque changes from f3 to f1, the torque correction amount 'e' is set to (f3-f1).

Furthermore, when the current moving state 'd' changes from speed zero to negative, and if the "moving state 'k' immediately before the moving state becomes speed zero" read from the moving-state storage unit 44 immediately before speed zero is positive, the moving direction before and after the change is not the same direction and is different. In this case, because the friction torque changes from f2 to f4, the torque correction amount 'e' is set to (f2-f4).

On the other hand, when the current moving state 'd' changes from speed zero to negative, and if the "moving state 'k' immediately before the moving state becomes speed zero" read from the moving-state storage unit 44 immediately before speed zero is negative, the moving direction before and after the change is the same direction. In this case, because the friction torque changes from f3 to f4, the torque correction amount 'e' is set to (f3-f4).

In the case of the moving path assumed in the second embodiment, in the state from the state (1) to the state (2), the current moving state 'd' changes from speed zero to positive, and the "moving state 'k' immediately before the moving state becomes speed zero" read from the moving-state storage unit 44 immediately before speed zero is negative, that is, the moving direction before and after the change is different. Accordingly, (f3-f1) is selected for the torque correction amount 'e'.

In the state from the state (3) to the state (4), the current moving state 'd' changes from speed zero to positive, and the "moving state 'k' immediately before the moving state becomes speed zero" read from the moving-state storage unit 44 immediately before speed zero is positive, that is, the moving direction before and after the change is the same. Accordingly, (f2-f1) is selected for the torque correction amount 'e'.

In the state from the state (4) to the state (5), because the current moving state 'd' changes from positive to negative, (f4-f1) is selected for the torque correction amount 'e'. Further, in the state from the state (6) to the state (7), the current moving state 'd' changes from speed zero to negative, and the "moving state 'k' immediately before the moving state becomes speed zero" read from the moving-state storage unit 44 immediately before speed zero is negative. Accordingly, the correction-amount selection unit 5b selects (f3-f4) as the torque correction amount 'e' to be used in the case where the moving direction before and after the change is the same.

As described above, according to the second embodiment, even if the motor is stopped temporarily during movement in the same direction, the torque command output to the motor can be corrected. Therefore, as in the first embodiment, the tracking error resulting from the change of the friction torque at the time of change of the moving state can be corrected. In addition, according to the second embodiment, even if the motor is stopped temporarily before being reversed, correction of the torque command to be output to the motor can be performed by an appropriate correction amount taking into consideration a remaining amount of the friction torque in the stopped state. Accordingly, the locus tracking error can be properly corrected regardless of the moving state before and after the moving direction of the motor is reversed. At this time, as in the first embodiment, the response of the motor is simulated to perform a speed sign determination with respect to the model position, which is the simulated response, thereby enabling to determine the moving state stably.

In each of the embodiments described above, a case where a table is moved has been explained. However, each of the embodiments can be applied similarly even when other mechanical elements such as a tool and a machining head are moved.

Furthermore, in each of the embodiments described above, a current command can be used instead of a torque command. In this case, by multiplying the current command by a torque constant, the current command can be converted to the torque command.

Further, in each of the embodiments described above, it has been explained that a rotational position of a motor is used as a feedback position. However, a table position can be detected by a linear scale or the like and can be fed back. In this case, the table position detected by the linear scale or the like is used as the feedback position.

In addition, in each of the embodiments described above, it has been explained that a motor that is one of the constituent elements to be controlled is a rotary motor, by expressing a drive force as torque. However, the motor referred to in the present invention is not limited to the rotary motor and can be a linear motor. That is, the contents of the first and second embodiments can be directly applied to a case where the motor that is one of the constituent elements to be controlled is the linear motor, by replacing the torque by a propulsion force.

INDUSTRIAL APPLICABILITY

As described above, the servo control device according to the present invention is useful as a servo control device that can reduce a tracking error generated due to friction.

REFERENCE SIGNS LIST 1a, 1b servo control device, 2 motor, 3 servo control unit, 4a, 4b moving-state determination unit, 5a, 5b correction-amount selection unit, 6 addition unit, 30, 32 addition/subtraction unit, 31 position control unit, differential operation unit, 34 speed control unit, 41 position-control simulation unit, 42 motor simulation unit, 43a, 43b model-speed-sign determination unit, 44 moving-state storage unit immediately before speed zero, 81 position detector, 82 ball screw, 83 nut, 84 table, 85 linear guide.

The invention claimed is:

1. A servo control device comprising a servo control unit that calculates a drive command that causes a feedback position from a motor to be driven to follow a command position, to drive the motor according to the drive command, wherein the servo control device comprises:
a moving-state determination unit that determines as to which of positive, negative, or zero a speed of the motor is by simulating a response of the motor, and outputs a determination result as a moving state;
a correction-amount selection unit that selects a correction amount according to a change pattern of the moving state at a timing when the determined moving state changes; and
an addition unit that adds the correction amount output from the correction-amount selection unit to the drive command calculated by the servo control unit to generate a corrected drive command, and sets the corrected drive command as a drive command to the motor instead of the drive command calculated by the servo control unit, and wherein
the moving-state determination unit includes a moving-state storage unit immediately before speed zero that stores a moving state immediately before the moving state changes to speed zero, at a point in time when the moving state has changed from a state other than speed zero to speed zero, and
the moving-state determination unit outputs the stored moving state immediately before the moving state changes to speed zero to the correction-amount selection unit as the moving state immediately before speed zero, and
the correction-amount selection unit outputs
a correction amount corresponding to each of a case where the moving state has changed from positive to negative and a case where the moving state has changed from negative to positive, respectively, and
in a case where the moving state has changed from speed zero to a state other than speed zero, and the moving state immediately before the speed zero and the moving state after a change are different from each other, the correction-amount selection unit outputs a correction amount corresponding to the case.

2. The servo control device according to claim 1, wherein the servo control unit includes a position control unit that performs a position control operation so as to reduce a position deviation as a difference between the command position and the feedback position,
a differential operation unit that differentiates the feedback position, and
a speed control unit that performs a speed control operation so as to reduce a speed deviation as a difference between an output of the position control unit and an output of the differential operation unit and outputs the drive command.

3. The servo control device according to claim 1, wherein the moving-state determination unit includes
a position-control simulation unit that calculates a model speed by inputting the command position and a model position to perform the same operation as that of the position control unit,
a motor simulation unit that simulates the feedback position with respect to the model speed to output the model position, and
a model-speed-sign determination unit that determines as to which of positive, zero, or negative a sign of the model speed is, and outputs a determination result as the moving state to the correction-amount selection unit.

4. The servo control device according to claim 1, wherein the correction-amount selection unit outputs the correction amount corresponding to a case where the moving state has changed from positive to negative or from negative to positive, and a case where the moving state has changed from speed zero to a state other than speed zero, respectively.

5. A servo control method for calculating a drive command that causes a feedback position from a motor to follow a command position, to drive the motor according to the drive command, wherein
the servo control method comprises:
outputting a determination result as a moving state, the determination result being obtained by determining as to which of positive, negative, or zero a speed of the motor is by simulating a response of the motor;
selecting a correction amount according to a change pattern of the moving state at a timing when the determined moving state changes; and
generating a corrected drive command by adding the correction amount to the calculated drive command, and setting the corrected drive command as a drive command to the motor instead of the calculated drive command, and wherein
the outputting includes, storing a moving state immediately before the moving state changes to speed zero, at a point in time when the moving state has changed from a state other than speed zero to speed zero, and outputting the stored moving state immediately before the moving state changes to speed zero as the moving state immediately before speed zero, and
the selecting includes
outputting a correction amount corresponding to each of a case where the moving state has changed from positive to negative and a case where the moving state has changed from negative to positive, respectively, and
in a case where the moving state has changed from speed zero to a state other than speed zero, and the moving state immediately before the speed zero and the moving state after a change are different from each other, outputting a correction amount corresponding to the case.

6. A servo control device comprising:

processing circuitry configured to:

calculate a drive command that causes a feedback position from a motor to be driven to follow a command position, to drive the motor according to the drive command, determine as to which of positive, negative, or zero a speed of the motor is by simulating a response of the motor, and output a determination result as a moving state, select a correction amount according to a change pattern of the moving state at a timing when the determined moving state changes and the motor is temporarily stopped, and add the correction amount to the drive command calculated to generate a corrected drive command, and set the corrected drive command as a drive command to the motor instead of the drive command calculated; and the servo control device further comprising a memory that stores a moving state immediately before the moving state changes to speed zero, at a point in time when the moving state has changed from a state other than speed zero to speed zero, and wherein the processing circuitry is further configured to:

output the stored moving state immediately before the moving state changes to speed zero as the moving state immediately before speed zero, output a correction amount corresponding to each of a case where the moving state has changed from positive to negative and a case where the moving state has changed from negative to positive, respectively, and in a case where the moving state has changed from speed zero to a state other than speed zero, and the moving state immediately before the speed zero and the moving state after a change are different from each other, output a correction amount corresponding to the case.

7. The servo control device according to claim 6, wherein the processing circuitry is further configured to:

perform a position control operation so as to reduce a position deviation as a difference between the command position and the feedback position, perform a differential operation to differentiate the feedback position, and perform a speed control operation so as to reduce a speed deviation as a difference between an output of the position control operation and an output of the differential operation, and output the drive command.

8. The servo control device according to claim 6, wherein the processing circuitry is further configured to:

calculate a model speed by inputting the command position and a model position to perform the same operation as that of the position control unit, simulate the feedback position with respect to the model speed to output the model position, and determine as to which of positive, zero, or negative a sign of the model speed is, and output a determination result as the moving state.

9. The servo control device according to claim 6, wherein the processing circuitry is further configured to:

output the correction amount corresponding to a case where the moving state has changed from positive to negative or from negative to positive, and a case where the moving state has changed from speed zero to a state other than speed zero, respectively.

\* \* \* \* \*